Aug. 14, 1945.  C. E. SPRAGUE ET AL  2,382,827
REVERSING SPLIT PHASE MOTOR
Filed Sept. 1, 1942  2 Sheets-Sheet 1

INVENTORS
C. E. SPRAGUE & N. M. SPRAGUE
BY [signature]
ATTORNEY

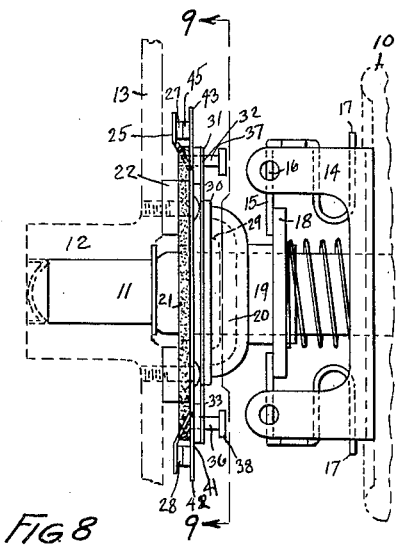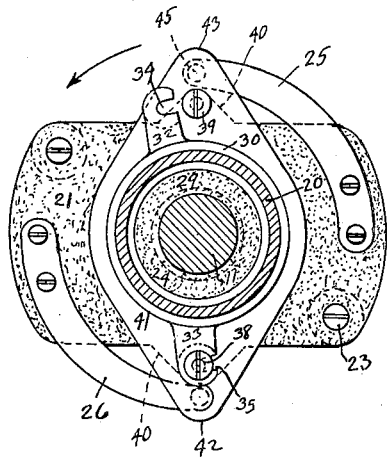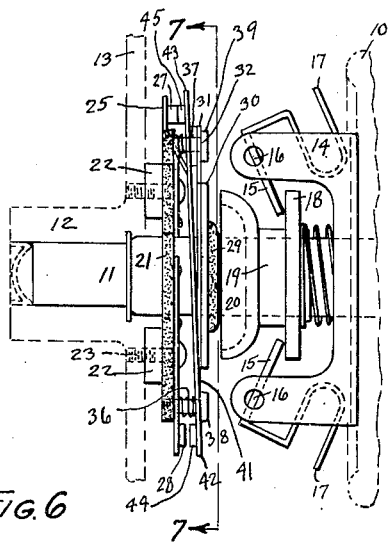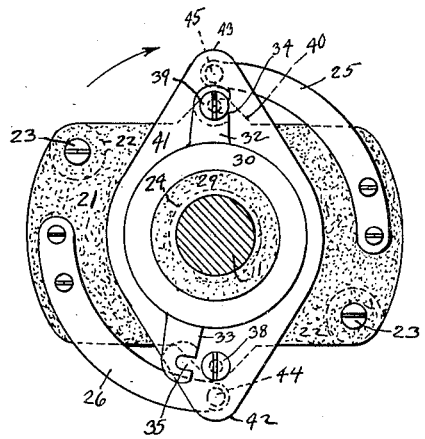

Patented Aug. 14, 1945

2,382,827

UNITED STATES PATENT OFFICE 2,382,827

REVERSING SPLIT-PHASE MOTOR

Chester E. Sprague and Nelson M. Sprague, Portland, Oreg.

Application September 1, 1942, Serial No. 456,848

4 Claims. (Cl. 172—279)

This invention relates generally to split phase motors and particularly to an instant reversing switch therefor.

The main object of this invention is to construct an instant reversing switch for split phase motors employing a purely mechanical means for varying the relationship of the windings instead of employing relays, transformers and other electrical elements commonly employed in electrically actuated reversing switches.

The second object is to construct a reversing switch of the class described which can be reversed without waiting for the motor to come to a full stop.

The third object is to construct a switch of the class described especially adapted for use in connection with motors where instant reversing is desirable, such as on a screw cutting lathe, elevators, and other types of equipment.

The fourth object is to construct a switch of the class described wherein the rotation of the rotor in either direction will set the switch or prepare it for the next reversing operation which is initiated by a manual operation or by an electrically operated actuator such as a solenoid.

The fifth object is to construct a simple and efficient form of switch for the purpose stated which will require a minimum amount of material essential in other lines of industry, and which can be applied to approximately ninety percent of the split phase motors now in use.

We accomplish these and other objects in the manner set forth in the following specification as illustrated in the accompanying drawings, in which:

Fig. 6 is a side elevation of the frictionally positioned switch unit showing the position of the parts when the rotor is turning in a clockwise direction.

Fig. 7 is a section taken along the line 7—7 in Fig. 6.

Fig. 8 is a view similar to Fig. 6 but showing the motor governor and the frictional switch parts in a position of rest.

Fig. 9 is a section taken along the line 9—9 in Fig. 8.

Similar numerals refer to similar parts throughout the several views.

Figure 4:
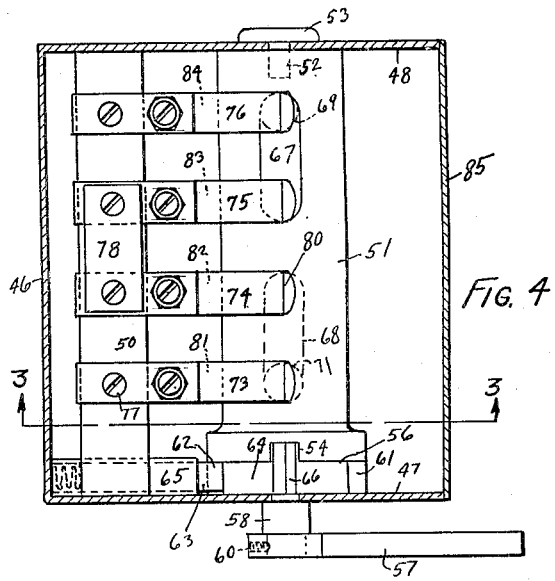
Fig. 4 is a side elevation of the manually operated switch with the cover cut along the line 5—5 in Fig. 3.

Referring in detail to the drawings, there is shown in dotted lines the position of the rotor 10 of a motor whose shaft 11 journals in the bearing 12 which forms a part of the stationary casing 13.

Attached to the rotor 10 is a common form of governor frame 14 whose inturned arms 15 are rockable on the pivots 16.

The arms 15 are provided with counterweights 17 which move outwardly as shown in Fig. 6 when the motor attains speed. The arms 15 bear against the flange 18 of a slidable plastic collar 19 whose bell shaped end 20 is commonly employed to control the starting winding circuit by means of a switch which is replaced by our device.

Referring particularly to our invention, same will be seen to consist of two principal parts; namely, a frictionally set switch unit F, and a manually actuated switch unit M.

Frictionally set switch unit

The frictionally set switch unit F consists of a base 21 of insulating material which is spaced from the motor casing 13 by means of collars 22 and secured to the casing 13 by means of the screws 23.

The base 21 is provided with a circular opening 24 through which the shaft 11 can pass without touching same. On the base 21 are mounted the spring contact arms 25 and 26 whose contact points 27 and 28 are diametrically opposite each other.

Encircling the shaft 11 and spaced therefrom is a collar 29 of insulating material on which is secured a friction ring 30 on the rear side of which is secured the hook plate 31 whose ends 32 and 33 are provided with slots 34 and 35 which will freely receive the bodies 36 and 37 of the screws 38 and 39. The screws 38 and 39 are threaded into the projections 40 of the base 21. A spring 36—A is placed on the screw body 36 between a projection 40 and the plate 41. A spring 37—A is placed on the screw body 37 between a projection 40 and the plate 41.

Between the hook plate 31 and the base 21 is mounted the floating plate 41 through which the bodies 36 and 37 of the screws 38 and 39 freely pass. The floating plate 41 has provided at its outer ends 42 and 43, the contact points 44 and 45 which are in alinement with the contact points 26 and 27.

It will be noted that the floating plate 41 is urged away from the members 25 and 26 by the springs 36—A and 37—A so that whichever end of the arms 32 or 33 is not engaging its screw 39 or 38 will be free to permit its associated contact points to separate. That is, if the arm 33, for example, as shown in Fig. 7, is not latched under the head of the screw 38, then when the motor comes up to speed and the bell shaped end 20 is retracted, the points 28 and 42 separate leaving the starting windings reset for a reverse rotation.

Manually actuated switch unit

The manually actuated switch unit M consists of a base 46 which may be mounted on the motor or any other convenient place, and which is provided with the ends 47 and 48 between which are disposed the bars 49 and 50 of insulating material.

A cylindrical switch rotor 51 is also disposed between the ends 47 and 48 and is pivoted to the end 48 by means of the pin 52 which forms a part of the head 53, which in turn is secured to the end 48 while the pin 52 extends freely into the rotor 51.

The rotor 51 is provided with an end slot 54 to receive the tongue 55 which projects from the cylindrical head 56 of the rotor 51 and affords a means for rotating the rotor 51 by means of the hand lever 57 which is mounted on a bushing 58 and secured to the stub shaft 59 by means of a set screw 60.

The member 56 is provided with the stops 61 and 62 to limit the movements of the member 51. A spring urged pawl 63 engages the cylindrical surface 64 and is contained within the guide 65. The surface 64 is provided with an intermediate notch 66 which holds the member 51 in an off position.

The member 51 is provided with an elongated contact bar 67 at one side of one end and a similar bar 68 at the other side of the other end thereof. The bar 67 is connected to the circular contact 69 by means of the rivet 70 while the contact bar 68 is connected to the circular contact 71 by means of the rivet 72.

The rivets 70 and 72 are shown as parts of the contacts 67 and 68 in the diagrammatic views 1 and 2 in which the member 51 is illustrated as a shaft for the sake of clearness.

Figure 3:
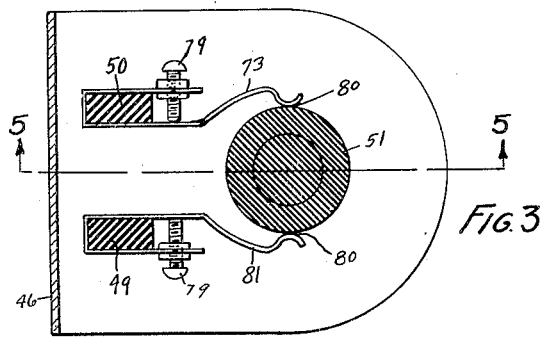
Fig. 3 is a transverse section through the manually operated switch taken along the line 3—3 in Fig. 4 with the cover removed.
Figure 5:
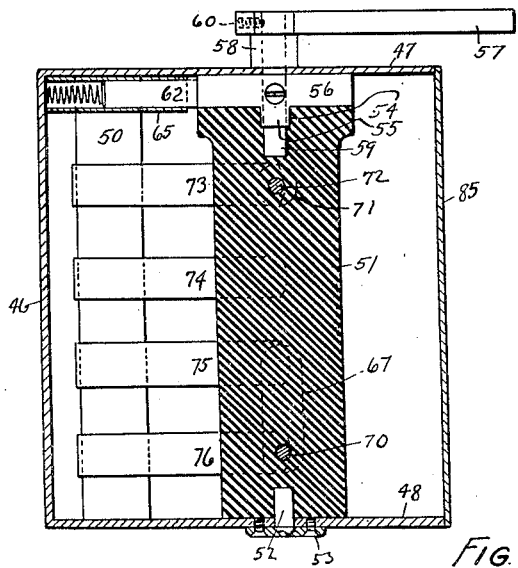
Fig. 5 is a section taken along the line 5—5 in Fig. 3.

It will be seen in Figs. 3, and 4, that there are disposed on the bar 50 a plurality of adjustable spring contact arms 73, 74, 75, and 76 which are secured to the bar 50 by means of the screws 77. The arms 74 and 75 are tied together electrically by means of the bar 78. Adjusting screws 79 control the pressure of the contact points 80 against the surface of the member 51 or the contact members 67, 68, 69, and 71.

Similar arms 81, 82, 83, and 84 are disposed along the bar 49 but these contacts are all separate. That is, they are not linked by a member similar to the bar 78. A cover 85 encloses the mechanism just described.

In connecting the units F and M to a split phase motor, the contacts 81 and 84 are connected to the power lines 95 and 94. The contact 83 is connected by a lead 86 to the contact arm 26 while the contact 82 is connected by the lead 87 to the contact arm 25. The floating plate 41 is connected by the lead 88 to the starting winding 89 whose lead 90 is connected to the contacts 74 and 75. The contact 73 is connected by the lead 91 to the running winding 92 of the motor. The winding 92 is connected by the lead 93 to the contact 76.

Figure 1:
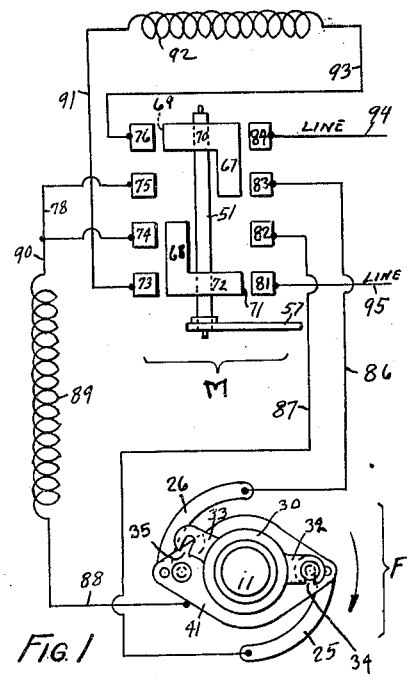
Fig. 1 is a diagrammatic view showing the parts in position for clockwise rotation of the motor.

The operation of this switch is as follows:

Assuming that the parts are in a position of rest as in Fig. 8, that is, with the member 20 in an outward position in which it bears against the friction ring 30 and the lever 57 is moved to a position which will bring about a clockwise rotation of the rotor 10, it follows that the clockwise rotation of the member 20 will, through frictional engagement with the disc 30, rotate the disc 30 and its attached arms 32 and 33 in a clockwise direction, causing the slot 34 to engage the body 37 of the screw 39 latched thereon as shown in Figs. 1, 6 and 7.

It will be seen in Fig. 1 that current now flows from the line wire 95 to the contact arm 81 to the circular contact 71, across the rivet 72 to the bar 68 which engages the contact arms 73 and 74. The contact 73 permits current to flow through the lead 91 to the running winding 92 and the members 93, 76, 70 and 84 to the line 94, and simultaneously current flows from the contact arm 74 to the starting winding 89 to the floating plate 41.

Figure 2:
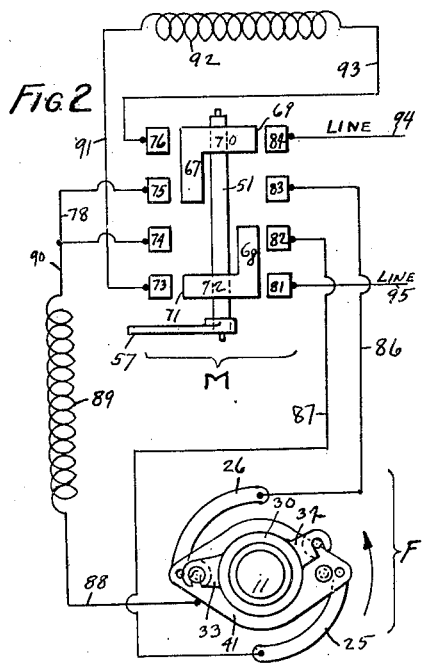
Fig. 2 is a view similar to Fig. 1 but showing the parts in position for a counter-clockwise rotation of the motor.

Now it will be remembered that the armature or rotor 10 is not yet in motion or up to speed, and the parts are still in a position shown in Fig. 8. That is, with the contacts 27 and 45 engaging and the contacts 28 and 44 engaging. Therefore current can flow through the starting winding arm 26, the lead 86 to the line 94 causing the rotor 10 to turn in the desired direction. However, as soon as it attains speed and the counter-weight 17 is thrown outward by centrifugal force to the position shown in Fig. 6 wherein the member 20 is retracted, then the contacts 28 and 44 are separated, thereby interrupting the flow of current through the starting winding 89 until the position of the lever 57 is reversed to that shown in Fig. 2.

A better understanding of this device may be gained by the simple statement that during any rotation of the rotor 10, the frictional unit F is set to a reversed position but does not become effective unitl the lever 57 is operated manually. That is to say, if the motor is operating in a clockwise direction, it is frictionally set to have the relation between its starting and running circuits instantly reversed by a manual switch operation, through purely mechanical means and without the employment of excessive and cumbersome transformers, relays, etc., and without waiting for the rotor to come to rest before reversing action can take place.

This is especially desirable where quick reversals are desired. It will be noted also that with this arrangement, there is a definite blocking or electric braking action set up to offset the inertia of the rotor and prevent excessive strain on the moving parts.

In practice, it is desirable to provide an antifriction thrust bearing between the members 31 and 41 in order that the coefficient of friction between the members 20 and 30 be greater than between the members 31 and 41 so that the member 20 may frictionally drive the parts in the desired direction.

We are aware that numerous devices have been constructed in the past for reversing motors. We therefore do not claim such devices broadly, but we do intend to cover all such forms and modifications of this device as fall fairly within the appended claims:

We claim:

1. A motor control system for a motor having starting and running windings and a speed responsive switch operating element; including a main control switch for energizing and deenergizing the starting winding of the motor for starting and stopping the motor and a reversing switch operable with the main control switch for operating the motor in a forward or a reverse direction, a pair of switches each normally urged to open position but closed by the speed responsive operating element of the motor when the motor is at rest, said pair of switches cooperating with the reversing switch and the main control switch for energizing the starting winding of the motor for starting the motor in either direction until the motor speed responsive switch operating element moves, and means engaged and moved by said speed responsive switch operating element during the initial movement thereof to hold one switch of said pair of switches from opening while permitting the other switch of said pair to open to deenergize the starting winding after the motor has started, whereby movement of the control and reversing switches for a reverse energization of the starting winding for operation of the motor in the reverse direction will effect an immediate energization of the starting winding for that purpose, even before the motor comes to a stop.

2. Reversing switch mechanism for a single phase motor including starting and running windings, and a speed responsive switch operating element; comprising a control switch for applying electrical energy to the running winding and a reversing switch operable therewith, a floating plate connected to the starting winding and having switch elements disposed at opposite ends thereof adapted to be closed and opened by the movement of said plate in response to movement of said speed responsive switch operating element, spring means for urging both ends of the plate in a switch opening direction, a pair of latches one latch for each end of the plate, selectively operable on one end or the other end of the plate to hold the selected end in switch closing position and allow the other end to move to open its switch to deenergize the starting winding after the motor has started so as to maintain the starting winding in readiness for a reverse energization, and means operated by the speed responsive switch operating element for shifting the latches during the initial rotary movement of the motor in either direction to properly set the latches for an instantaneous reversing of the motor by the appropriate actuation of the control and reversing switches.

3. Reversing switch mechanism for a single phase motor of the type having starting and running windings and a speed responsive switch operating element, comprising a control switch for applying electrical energy to the running winding, a reversing switch operable therewith, a selective switch mechanism including two sets of contacts normally urged to open position, said sets of contacts being closed by the speed responsive element and in cooperation with said reversing switch operable to apply electrical energy to the starting winding for starting the motor in either direction, and means operated by the speed responsive element for opening one set of said closed contacts to open the circuit thru the starting winding and operable to maintain the other set of contacts closed during the starting of the motor in preparation for an immediate reversal of operation of the motor at any time by a subsequent appropriate actuation of the control switch and the reversing switch.

4. A frictionally set switch unit for use with a split phase motor having a shaft, a main switch unit, and a speed responsive element; comprising a pair of relatively stationary spaced contacts, a movable plate having a contact at either end in position to engage the proximate contact of the first mentioned contacts, spring means for urging the adjacent contacts out of engagement with each other, means movable with the speed responsive element for forcing the movable plate toward the first mentioned contacts against the urge of said spring means to cause engagement of the two sets of contacts, and latching means frictionally engaging the motor shaft to hold one or the other of the plate carried contacts, depending on the direction of rotation of the motor shaft, in engagement with its proximate contact of the first mentioned pair while the spring means holds the other plate carried contact out of engagement with its proximate contact; whereby when the spaced contacts are connected with the line and the movable plate is connected to the starting winding, the latter may be energized for reversal of the motor before the motor comes to a full stop.

CHESTER E. SPRAGUE.
NELSON M. SPRAGUE.